US009858356B1

(12) United States Patent
Johnson et al.

(10) Patent No.: US 9,858,356 B1
(45) Date of Patent: Jan. 2, 2018

(54) AUTOMATED PAGE GENERATION USING VALUE-BASED RECOMMENDATIONS

(71) Applicant: Amazon Technologies, Inc., Seattle, WA (US)

(72) Inventors: Adam Brent Johnson, Seattle, WA (US); Adam Lloyd Days, Seattle, WA (US); Jonathan Paul Sillito, Bothell, WA (US); Jonathan Gilbert Gordon Tams, Midlothian (GB); David Paul Willis, Longmont, CO (US)

(73) Assignee: Amazon Technologies, Inc., Reno, NV (US)

( * ) Notice: Subject to any disclaimer, the term of this patent is extended or adjusted under 35 U.S.C. 154(b) by 247 days.

(21) Appl. No.: 14/634,444

(22) Filed: Feb. 27, 2015

(51) Int. Cl.
*G06F 17/00* (2006.01)
*G06F 17/30* (2006.01)
*G06F 17/22* (2006.01)

(52) U.S. Cl.
CPC .... *G06F 17/30905* (2013.01); *G06F 17/2247* (2013.01); *G06F 17/30867* (2013.01)

(58) Field of Classification Search
CPC ................................................ G06F 17/30867
See application file for complete search history.

(56) References Cited

U.S. PATENT DOCUMENTS

| | | | |
|---|---|---|---|
| 6,999,962 B2 * | 2/2006 | Julliard | G06F 17/30011 |
| 7,016,864 B1 | 3/2006 | Notz et al. | |
| 7,054,900 B1 * | 5/2006 | Goldston | G06Q 30/02 |
| | | | 709/203 |
| 7,069,271 B1 | 6/2006 | Fadel et al. | |
| 8,364,540 B2 * | 1/2013 | Soroca | G06F 17/30035 |
| | | | 705/14.64 |
| 8,688,536 B2 | 4/2014 | Singh et al. | |
| 8,694,363 B2 | 4/2014 | Olliphant et al. | |
| 8,751,507 B2 | 6/2014 | Kim et al. | |
| 8,996,530 B2 * | 3/2015 | LuVogt | G06F 17/30867 |
| | | | 707/740 |

(Continued)

OTHER PUBLICATIONS

Gavalas et al., "A web-based pervasive recommendation system for mobile tourist guides" Published online: May 10, 2011, © Springer-Verlag London Limited 2011, Pers Ubiquit Comput (2011), p. 759-770.*

*Primary Examiner* — Amelia Tapp
(74) *Attorney, Agent, or Firm* — Robert C. Kowert; Meyertons, Hood, Kivlin, Kowert & Goetzel, P.C.

(57) ABSTRACT

Methods, systems, and computer-readable media for automated page generation using value-based recommendations are disclosed. A plurality of content recommendations are determined for a web page using one or more recommenders. Individual ones of the content recommendations are assigned to individual ones of a plurality of interaction elements. Respective effectiveness values for individual ones of the interaction elements are determined based at least in part on the individual ones of the content recommendations assigned to the individual ones of the interaction elements. Based at least in part on the respective effectiveness values for the individual ones of the interaction elements, individual ones of the interaction elements are assigned to respective portions of the web page. The web page is generated based at least in part on the individual ones of the interaction elements assigned to the respective portions of the web page.

20 Claims, 8 Drawing Sheets

(56) References Cited

U.S. PATENT DOCUMENTS

| | | | | |
|---|---|---|---|---|
| 9,178,933 B1* | 11/2015 | Soland | ............... | H04L 67/306 |
| 9,524,077 B1* | 12/2016 | Pattan | ............... | G06F 3/0482 |
| 9,607,077 B2* | 3/2017 | Li | ............... | G06F 17/30684 |
| 2009/0150388 A1* | 6/2009 | Roseman | ............... | G06F 17/278 |
| 2015/0242755 A1* | 8/2015 | Gross | ............... | G06F 17/30867 |
| | | | | 706/46 |
| 2015/0248683 A1* | 9/2015 | Walkingshaw | ..... | G06F 17/3089 |
| | | | | 705/7.33 |
| 2016/0055159 A1* | 2/2016 | Connolly | ............ | G06F 17/3053 |
| | | | | 707/734 |
| 2016/0224560 A1* | 8/2016 | Hartman | ........... | G06F 17/30554 |

* cited by examiner

AUTOMATED PAGE GENERATION USING VALUE-BASED RECOMMENDATIONS

BACKGROUND

Large-scale computing systems, such as those associated with network-based production services, have become widely available in recent years. Examples of such systems include online merchants, internet service providers, online businesses such as photo processing services, corporate networks, cloud computing services, web-based hosting services, etc. These entities may maintain large numbers of computing devices (e.g., thousands of hosts) which are hosted in geographically separate locations and which are configured to process large quantities (e.g., millions) of client requests daily or even hourly. Complex systems may include many services that interact with one another in varied ways.

For example, web servers backed by distributed systems may provide marketplaces that offer goods and/or services for sale to consumers. For instance, consumers may visit a merchant's website to view and/or purchase goods and services offered for sale by the merchant (and/or third party merchants). Some network-based marketplaces (e.g., Internet-based marketplaces) include large electronic catalogues of items offered for sale. For each item offered for sale, such electronic catalogues typically include at least one product detail page (e.g., a web page) that specifies various information about the item, such as a description of the item, one or more pictures of the item, as well as specifications (e.g., weight, dimensions, capabilities) of the item. Additionally, a marketplace may offer other types of pages to potential customers, such as a home page that introduces a customer to the marketplace and a search page that lists products relevant to one or more search terms.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for automated page generation using value-based recommendations are described. Using the techniques described herein, a web page may be dynamically generated upon receiving a request, e.g., from a customer of an online merchant or other entity that interacts with the customer. Various recommenders may produce recommendations for content to include in the web page, such as products or promotions offered by the merchant. The recommendations may be generated by the recommenders based on characteristics of the request and/or characteristics of the customer. The recommendations may be assigned to various interaction elements. The interaction elements may represent different ways of visualizing content in a web page. The interaction elements with the assigned recommendations may then be scored based on their effectiveness values, e.g., relative to one or more goal metrics for the web page. The interaction elements with the assigned recommendations may be automatically placed in the web page based on their effectiveness values. For example, the most effective interaction element may be placed in the most valuable location in the web page, and the second most effective interaction element may be placed in the second most valuable location in the web page. In this manner, web pages may be automatically and dynamically generated to optimize one or more goal metrics.

Figure 1A:
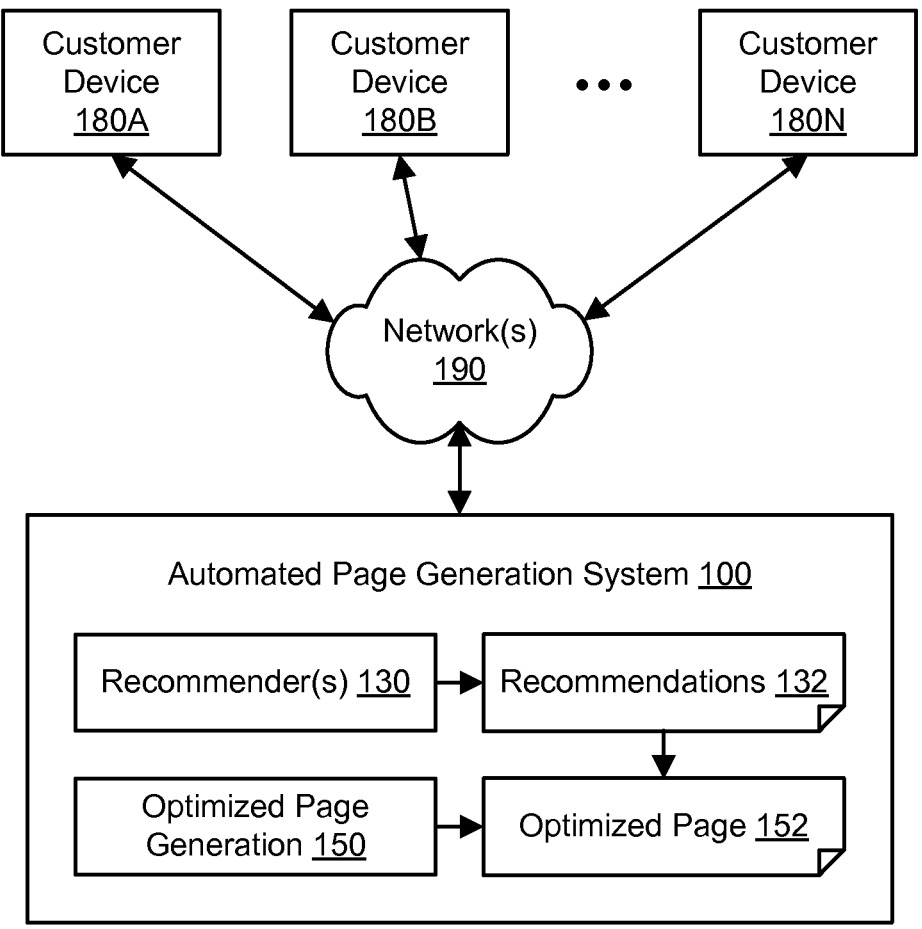
FIG. 1A illustrates an example system environment for automated page generation using value-based recommendations, according to one embodiment.

FIG. 1A illustrates an example system environment for automated page generation using value-based recommendations, according to one embodiment. The example system environment may comprise an automated page generation system 100 that generates web pages for customer devices 180A-180N. The automated page generation system 100 may communicate with the customer devices 180A-180N using one or more networks, e.g., network(s) 190. The automated page generation system 100 may receive requests for web pages from the customer devices 180A-180N, generate the web pages using automated techniques for adding recommended content, and send the web pages to the requesting devices. As will be discussed in greater detail below, the web pages may be optimized relative to one or more goal metrics. As used herein, the terms "optimize" and "optimized" generally refer to improvement relative to one or more goals rather than necessarily optimal or ideal. The term "web page" (or "page") is intended to include any suitable types of code and/or data for implementing a structured multimedia format (e.g., including text and/or graphics) that is displayable in a browser program and/or a dedicated application provided by or on behalf of a merchant or other entity. Accordingly, the term "web page" (or "page") may include, but is not limited to, HTML-based formats and other markup-language-based formats. In general, a web page may permit user interaction, e.g., by a user selecting one or more links or other interactive elements to view product-related information and/or engage in transactions related to goods or services offered by a merchant.

The automated page generation system 100 may be operated by or on behalf of an internet-based merchant or other online entity. For example, the automated page generation system 100 may generate various types of web pages that permit customers to search for products in a product catalogue, browse product categories, view detailed information for particular products, purchase particular products, or engage in other types of transactions with a merchant. The customer devices 180A-180N may be operated by or on behalf of customers of the merchant. As used herein, the term "customer" is intended to include entities that have previously engaged in transactions with a merchant or other entity (e.g., for the sale or lease of goods and/or services) and also entities that may potentially engage in such transactions in the future. The customer devices 180A-180N may vary in type and configuration. The customer devices 180A-180N may be implemented using any suitable number and configuration of computing devices, any of which may be implemented by the example computing device 3000 illustrated in FIG. 7. Although three customer devices 180A, 180B, and 180N are illustrated for purposes of example, it is contemplated that any suitable number and configuration of customer devices may interact with the automated page generation system 100.

The automated page generation system 100 may include various components, modules, or functionalities such as one or more recommenders 130 and an optimized page generation functionality 150. The recommender(s) 130 and optimized page generation functionality 150 may collectively be used by the automated page generation system 100, potentially along with other components, to generate web pages that are optimized to include particular elements of content. As will be discussed in greater detail below, the recommender(s) 130 may produce recommendations 132 for content to include in the optimized web page 152. The recommendations 132 may be produced based on characteristics of the request for the web page, characteristics of the customer who produced the request, and/or other suitable characteristics. The optimized page generation functionality 150 may produce an optimized web page 152 that includes one or more of the recommendations 132 in an optimized format. In one embodiment, the optimized page generation functionality 150 may position recommendations on the page based on the effectiveness value of the recommendations relative to one or more goal metrics for the page. For example, recommendations (or sets of recommendations) with higher effectiveness values may be placed in more valuable locations than recommendations (or sets of recommendations) with lower effectiveness values.

An effectiveness value may represent an estimated likelihood that the placement of a content recommendation (e.g., a product or promotion) will influence the behavior of the customer relative to the one or more goal metrics. The effectiveness values may be determined and/or updated using any suitable techniques, e.g., using machine learning techniques based on a purchase history for a particular customer and/or a set of customers. The goal metrics may include one or more profit metrics, one or more engagement metrics, and/or any other suitable metrics. The goal metrics may vary for different types of pages, e.g., home pages, product detail pages, product category pages, search result pages, shopping cart pages, post-checkout pages, and/or other suitable types of pages. The goal metrics may be configured using any suitable technique(s). By optimizing based on goal metrics, content recommendations that are more likely to influence the behavior of the customer (e.g., to purchase products) may be given favorable or preferred placement on the web page.

Figure 7:
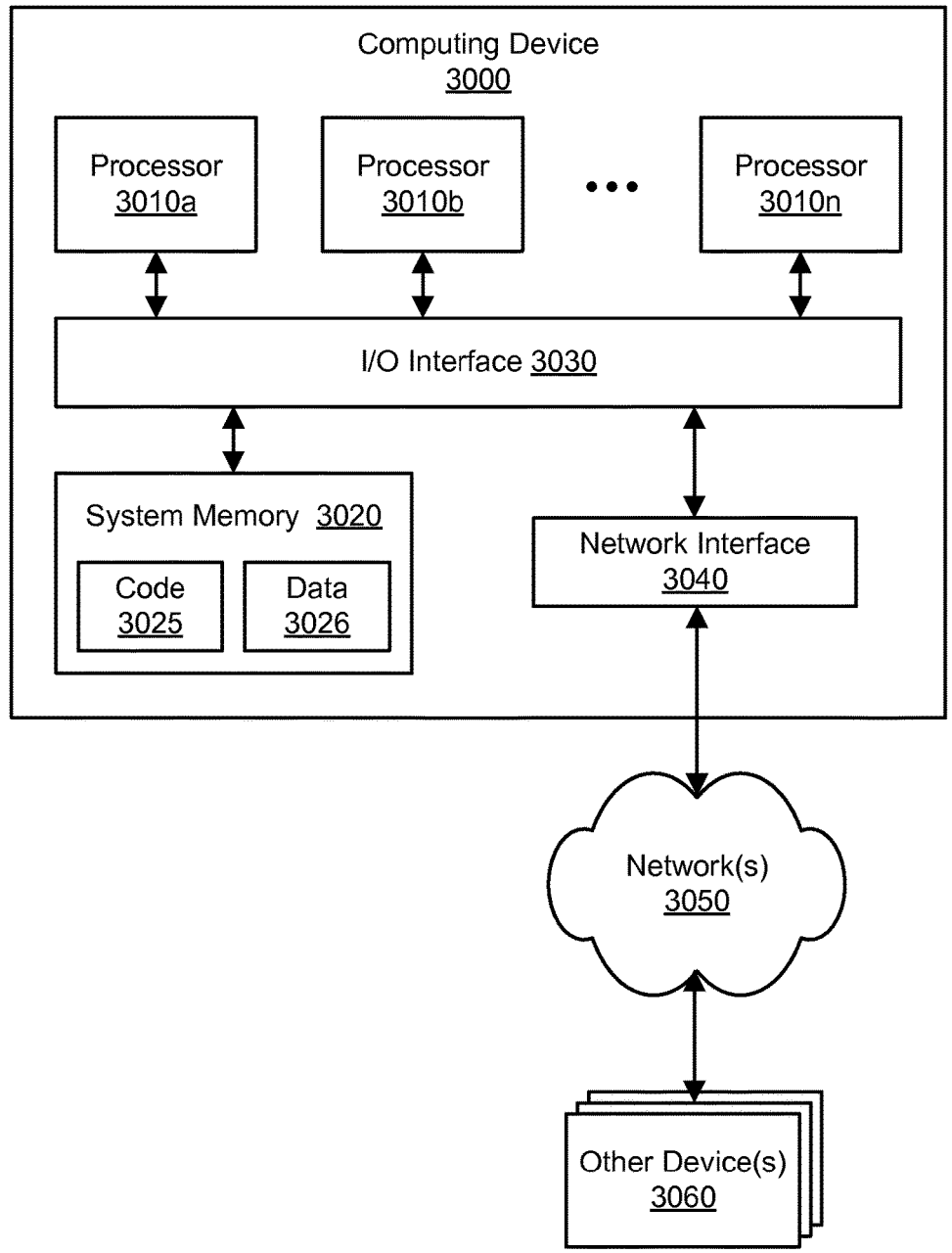
FIG. 7 illustrates an example computing device that may be used in some embodiments.

The automated page generation system 100 may be implemented using any suitable number and configuration of computing devices, any of which may be implemented by the example computing device 3000 illustrated in FIG. 7. The computing devices may be located in any suitable number of data centers or geographical locations. In various embodiments, the functionality of the different components (e.g., recommender(s) 130 and optimized page generation functionality 150) of the automated page generation system 100 may be provided by the same computing device or by different computing devices. If any of the components of the automated page generation system 100 are implemented using different computing devices, then the components and their respective computing devices may be communicatively coupled, e.g., via network(s) 190. Each of the components of the automated page generation system 100 may represent any combination of software and hardware usable to perform their respective functions, as discussed as follows. Operations implemented by the automated page generation system 100 may be performed automatically, e.g., without a need for user initiation or user intervention after an initial configuration stage, and programmatically, e.g., by execution of program instructions on at least one computing device. It is contemplated that the automated page generation system 100 may include additional components not shown, fewer components than shown, or different combinations, configurations, or quantities of the components shown.

In one embodiment, the automated page generation system 100 may implement a service-oriented architecture and may include multiple services configured to communicate with each other (e.g., through message passing) to carry out various tasks. For example, a service may be configured to retrieve input data from one or more storage locations and/or from a service request, transform or otherwise process the data, and generate output data. In some cases, a first service may call a second service, the second service may call a third service to satisfy the request from the first service, and so on. To build a web page dynamically, numerous services may be invoked in a hierarchical manner to build various components of the web page. The services may be configured to process requests from various internal or external systems, such as other components of the automated page generation system 100 and/or customer devices 180A-180N. For instance, a person operating a web browser on a customer device 180A-180N may submit a request for data, e.g., data associated with a product detail page, a shopping cart application, a checkout process, a search query, etc.

Figure 1B:
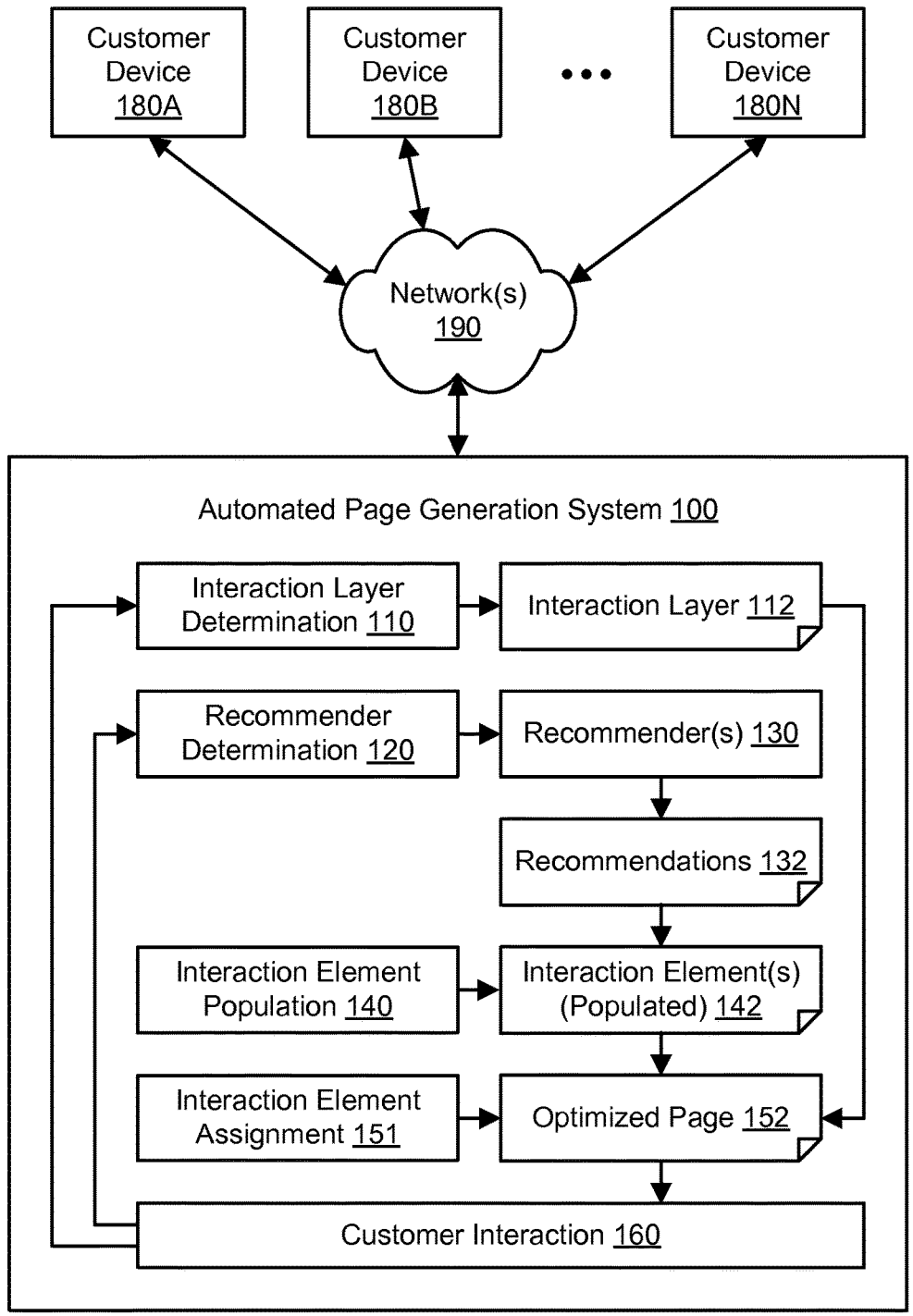
FIG. 1B illustrates further aspects of the example system environment for automated page generation using value-based recommendations, according to one embodiment.

FIG. 1B illustrates further aspects of the example system environment for automated page generation using value-based recommendations, according to one embodiment. The automated page generation system 100 may include various components, modules, or functionalities. In addition to the one or more recommenders 130 discussed above with respect to FIG. 1A, the automated page generation system 100 may include an interaction layer determination functionality 110, a recommender determination functionality 120, an interaction element population functionality 140, an interaction element assignment functionality 151, and a customer interaction functionality 160. Various combinations of these components, such as the interaction layer determination functionality 110, recommender determination functionality 120, interaction element population functionality 140, and/or interaction element assignment functionality 151, may implement aspects of the optimized page generation functionality 150 as discussed with respect to FIG. 1A. The components of the automated page generation system 100 may collectively be used to generate web pages that are optimized to include particular elements of content.

The customer interaction functionality 160 may enable the automated page generation system 100 to interact with any of the customer devices 180A-180N, e.g., over the network(s) 190. In one embodiment, the customer interaction functionality 160 may receive requests for web pages from the customer devices 180A-180N. In receiving such a request, the customer interaction functionality 160 may also determine any characteristics that are relevant to generating the optimized web page 152. For example, the request itself may include particular characteristics, e.g., characteristics of the type of web page requested and/or other contents of the request. As another example, the customer may also be associated with particular characteristics, e.g., characteristics associated with a customer device, customer account, and/or customer session, including purchase history, browse history, and the current status of a shopping cart and/or wish list.

The interaction layer determination functionality 110 may select or otherwise determine an interaction layer 112 for the requested web page. The interaction layer 112 may include a plurality of locations for interaction elements and may represent a base or template on which to build the requested web page. The interaction elements may represent different ways of visualizing content in a web page. The interaction layer 112 may also be characterized by a set of dimensions, e.g., representing available pixels in the horizontal and vertical axes. The interaction layer 112 may be selected or otherwise determined based on characteristics of the request, characteristics of the customer, and/or other suitable characteristics. For example, the interaction layer 112 may be determined based at least in part on the available screen space of the device from which the request originated. As another example, the interaction layer 112 may be determined based at least in part on the type of web page requested, e.g., home pages, product detail pages, product category pages, search result pages, shopping cart pages, post-checkout pages, and/or other suitable types of pages. As yet another example, based on characteristics of the customer, the interaction layer may be selected with a particular display format that may be preferred by the customer, e.g., a waterfall-styled newsfeed of products. In one embodiment, machine learning techniques may be used to select or otherwise determine the interaction layer 112, e.g., to predict customer preferences for display formats based on the previous actions of this customer or sets of customers. The interaction layer 112 may contain different positions, locations, portions or regions. The different positions, locations, portions or regions may be associated with different goal metrics and/or different values relative to one or more goal metrics. The goal metrics and/or value of the different positions, locations, portions or regions may vary by customer, by region, or on any other suitable basis.

The recommender determination functionality 120 may determine the one or more recommenders 130 for building the requested web page using the interaction layer 112. The recommender(s) 130 may represent various modules, services, or other programmatic components that may be invoked to produce recommendations 132 for content to include in the requested web page. For example, one recommender may be configured to generate recommendations based on products reachable from a particular browse node, another recommender may be configured to generate recommendations based on new product offerings at the merchant, another recommender may be configured to generate recommendations based on related product offerings to earlier recommendations, and yet another recommender may be configured to generate recommendations based on session similarities. As another example, another recommender may be configured to generate negative recommendations based on recent purchases or recent browse history; these negative recommendations may essentially disqualify items from being placed on the page. The automated page generation system 100 may implement filters to disqualify some products and/or promotions from inclusion in a web page, either using negative recommendations or any other suitable filtering technique. The recommender(s) 130 may be determined based on characteristics of the request, characteristics of the customer or customer device, and/or other suitable characteristics. In one embodiment, the recommender(s) 130 may be determined based on the evaluation of rules, e.g., to include or disqualify particular recommenders based on characteristics of the request, characteristics of the customer, and/or other suitable characteristics.

As discussed above, the recommender(s) 130 may produce recommendations 132 for content to include in the optimized web page 152. The recommendations 132 may include products, promotions, and/or other suitable types of content. Different recommenders may produce different sets of recommendations. Each recommendation may be associated with an initial effectiveness value, e.g., a degree of expected influence relative to the one or more goal metrics for the web page. Additionally, each recommender may be associated with a confidence value, and the initial effectiveness value may be multiplied by the confidence value (also referred to as a confidence multiplier). In one embodiment, the confidence values may range from zero to one, and the confidence values may be positive or negative. The confidence multiplier for a recommender may be determined using any suitable technique(s), including machine learning techniques based on the history of one or more customers (e.g., this particular customer) interacting with recommendations from a particular recommender. The confidence multiplier for the recommender may be associated with a set of customers (e.g., based on common characteristics of those customers) or may be associated only with the particular customer who sent the request. The recommendations 132 may be produced based on characteristics of the request for the web page, characteristics of the customer or customer device, and/or other suitable characteristics.

The interaction element population functionality 140 may assign particular content recommendations to particular interaction elements. This assignment may be referred to as populating the interaction elements, thus generating one or more populated interaction elements 142. The interaction elements may represent different ways of visualizing or displaying content in a web page. For example, the interaction elements may include various configurations for vertical lists of products or promotions, horizontal lists of products or promotions, tiled displays of products or promotions, scrollable displays of products or promotions, and other suitable ways of showing content. A particular interaction element may contain slots for displaying a fixed number of items simultaneously or may instead display a large number of items in multiple pages or batches, e.g., by scrolling through the different item. A particular interaction element may be configured to display items of content in one or more rows and one or more columns. A particular interaction element may also be configured for particular types of input, e.g., for display and user interaction on touch-sensitive devices. A particular interaction element may be configured to change dynamically based on interaction with the user, e.g., to display additional items of content or drill down on a selected item. The interaction elements may be selected from a set of available interaction elements on any suitable basis, e.g., based on characteristics of the request, characteristics of the customer, characteristics of the recommenders, characteristics of the recommendations, and/or other suitable characteristics. In one embodiment, one or more of the interaction elements may be dynamically created, e.g., based on characteristics of the request, characteristics of the customer, characteristics of the recommenders, characteristics of the recommendations, and/or other suitable characteristics.

The content recommendations 132 may be assigned to the various interaction elements 142 based on their effectiveness values, e.g., their initial effectiveness values multiplied by the confidence values for the recommenders. The content recommendations may be assigned to various interaction elements 142 based on rules associated with the interaction elements and/or with the interaction layer 112. Rules may be associated with particular products or vendors, interaction layers, and/or interaction elements. In one embodiment, each interaction element may be assigned the recommendations with the highest effectiveness values that qualify under the relevant rules for the interaction element. The rules may qualify or disqualify particular recommendations for a particular interaction element. For example, a particular interaction element may accept content recommendations only from one or more designated recommenders. As another example, a particular interaction element may accept no more than a particular number of content recommendations. As another example, an interaction layer may prohibit particular categories of content based on characteristics of the customer or on the region. As yet another example, a particular interaction element, product, or interaction layer may implement a rule to honor a contractual agreement regarding one or more products, e.g., to disqualify promoting a competitor. In one embodiment, a particular recommendation may be assigned to multiple interaction elements 142. In one embodiment, a particular recommendation may be assigned to none of the interaction elements 142.

In one embodiment, effectiveness values may be determined for the interaction elements given the assignments of content recommendations 132 to the interaction elements 142. An effectiveness value for one of the interaction elements 142 may represent a degree of expected influence relative to the one or more goal metrics for the web page. In one embodiment, the effectiveness values for the interaction elements 142 may be determined based at least in part on the effectiveness values for the assigned content recommendations 132, e.g., their initial effectiveness values multiplied by the confidence values for the corresponding recommenders 130. The effectiveness values for the assigned content recommendations 132 may be combined in any suitable manner to produce the effectiveness values for the interaction elements 142. For example, the effectiveness value for a particular interaction element may represent an arithmetic mean of the various effectiveness values of the assigned content recommendations. In one embodiment, the effectiveness value for a particular interaction element may also be based on a confidence multiplier for the interaction element itself, e.g., by a confidence value between zero and one that is multiplied by the effectiveness value for the particular interaction element. The confidence multiplier for the interaction element may be determined using any suitable technique(s), including machine learning techniques based on the history of one or more customers (e.g., this particular customer) interacting with the particular interaction element. The confidence multiplier for the interaction element may be global or may be associated only with the particular customer who sent the request.

The interaction element assignment functionality 151 may assign particular interaction elements 142 to particular positions, locations, portions or regions (generally referred to herein collectively as "locations") in the interaction layer 112. The various locations may be associated with different values, e.g., relative to the one or more metrics. For example, locations earlier or higher in the interaction layer 112 may be associated with higher values than locations later or lower in the interaction layer. The assignments may be determined based at least in part on the effectiveness values for the interaction elements 142 and on the optimization of the one or more goal metrics for the web page. For example, recommendations (or sets of recommendations) with higher effectiveness values may be placed in more valuable locations than recommendations (or sets of recommendations) with lower effectiveness values. The goal metrics may include one or more profit metrics, one or more engagement metrics, and/or any other suitable metrics. The goal metrics may vary for different types of pages, e.g., home pages, product detail pages, product category pages, search result pages, shopping cart pages, post-checkout pages, and/or other suitable types of pages. The goal metrics may also vary by location in an interaction layer. The goal metrics may be configured using any suitable technique(s). In one embodiment, the most effective interaction element may be placed in the most valuable location in the web page, and the second most effective interaction element may be placed in the second most valuable location in the web page. In this manner, the web page 152 may be automatically and dynamically built to optimize one or more goal metrics. The interaction elements 142 may be placed in the interaction layer 112 (and thus in the resulting web page 152) in an iterative manner, as will be discussed in greater detail with respect to FIG. 6.

Turning back to FIG. 1B, the customer interaction functionality 160 may send the optimized web page 152 to the customer device from which the request originated. The web page 152 (e.g., the code and/or data for the web page) may be provided to the target device by sending the relevant code and/or data across the network(s) 190. In one embodiment, portions of the web page may be sent to the target device before all of the web page has been generated.

Figure 2:
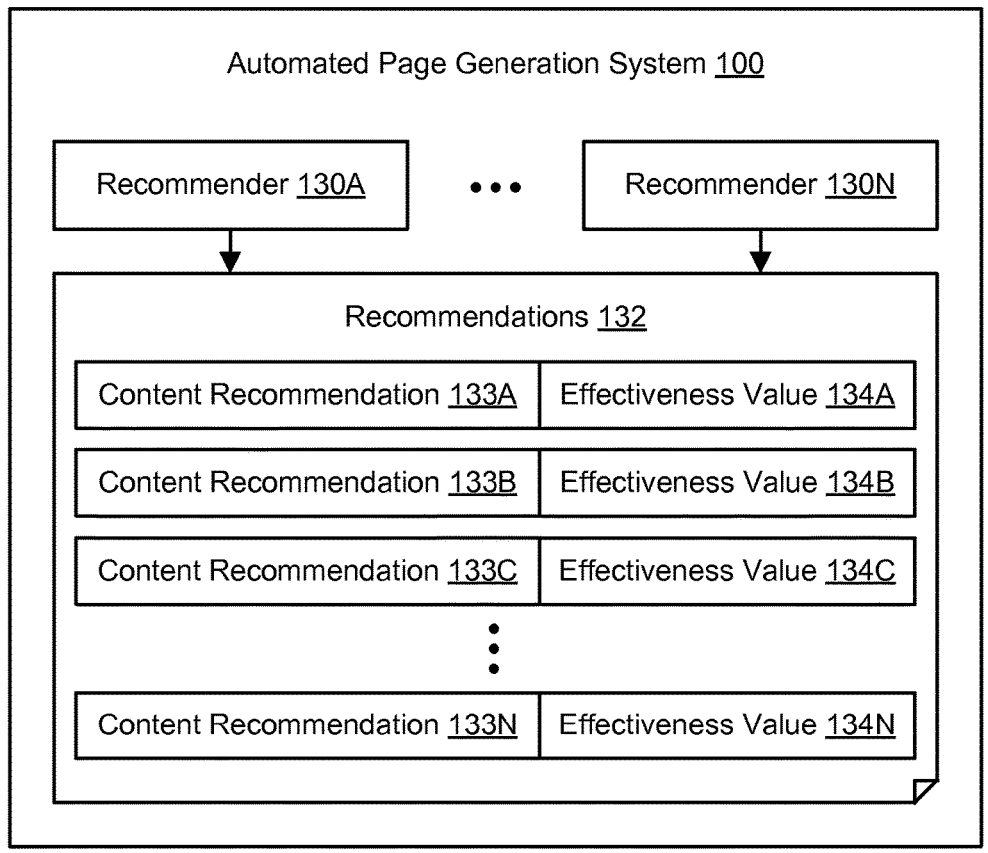
FIG. 2 illustrates an example of content recommendations usable for automated page generation, according to one embodiment.

FIG. 2 illustrates an example of content recommendations usable for automated page generation, according to one embodiment. As discussed above, the recommender(s) 130 may produce recommendations 132 for content to include in the optimized web page 152. As shown in the example of FIG. 2, the recommenders may include recommenders 130A through 130N. Although two recommenders 130A and 130N are shown for purposes of illustration and example, it is contemplated that other numbers and configurations of recommenders may be used with the automated page generation system 100. The recommenders 130A-130N may represent various modules, services, or other programmatic entities that may be invoked to produce recommendations 132 for content to include in the requested web page. For example, one recommender may be configured to generate recommendations based on products reachable from a particular browse node, another recommender may be configured to generate recommendations based on new product offerings at the merchant, another recommender may be configured to generate recommendations based on related product offerings to earlier recommendations, and yet another recommender may be configured to generate recommendations based on session similarities. As another example, another recommender may be configured to generate negative recommendations based on recent purchases or recent browse history; these negative recommendations may essentially disqualify items from being placed on the page. The automated page generation system 100 may implement filters to disqualify some products and/or promotions from inclusion in a web page, either using negative recommendations or any other suitable filtering technique. The recommenders 130A-130N may be determined based on characteristics of the request, characteristics of the customer or customer device, and/or other suitable characteristics. In one embodiment, the recommender(s) 130 may be determined based on the evaluation of rules, e.g., to include or disqualify particular recommenders based on characteristics of the request, characteristics of the customer, and/or other suitable characteristics.

The recommendations 132 may include products, promotions, and/or other suitable types of content. Different recommenders may produce different sets of recommendations. The recommendations 132 may be produced based on characteristics of the request for the web page, characteristics of the customer who produced the request, and/or other suitable characteristics. As shown in the example of FIG. 2, the recommendations may include recommendations 133A, 133B, and 133C through 133N. Although four recommendations 133A-133N are shown for purposes of illustration and example, it is contemplated that other numbers and configurations of recommendations may be used with the automated page generation system 100.

As shown in the example of FIG. 2, each of the recommendations 133A-133N may be associated with a corresponding effectiveness value 134A-134N. The effectiveness values 134A-134N may represent a degree of expected influence relative to the one or more goal metrics for the web page. The content recommendations 133A-133N may be ranked according to their effectiveness values 134A-134N, e.g., from most influential to least influential in optimizing the one or more goal metrics. Larger positive values may represent greater effectiveness than smaller positive values, smaller negative values may represent greater effectiveness than larger negative values, and positive values may represent greater effectiveness than negative values.

In one embodiment, the effectiveness values 134A-134N may represent initial effectiveness values, e.g., effectiveness values for the elements of content that are independent of the recommenders 130A-130N. In one embodiment, each recommender may be associated with a confidence value, and the initial effectiveness value may be multiplied by the confidence value (also referred to as a confidence multiplier). The confidence values may range from zero to one, and the confidence values may be positive or negative. The confidence multiplier for a recommender may be determined using any suitable technique(s), including machine learning techniques based on the history of one or more customers (e.g., this particular customer) interacting with recommendations from a particular recommender. The confidence multiplier for the recommender may be global or may be associated only with the particular customer who sent the request. In one embodiment, the effectiveness values 134A-134N may represent recommender-specific effectiveness values, e.g., initial effectiveness values for the elements of content multiplied by the confidence values for the recommenders 130A-130N. The initial effectiveness values associated with particular recommendations may include both intrinsic and extrinsic components. The intrinsic components may represent values learned through prior customer interactions, and the extrinsic components may represent values dictated by contractual obligations with vendors or other partners.

Figure 3:
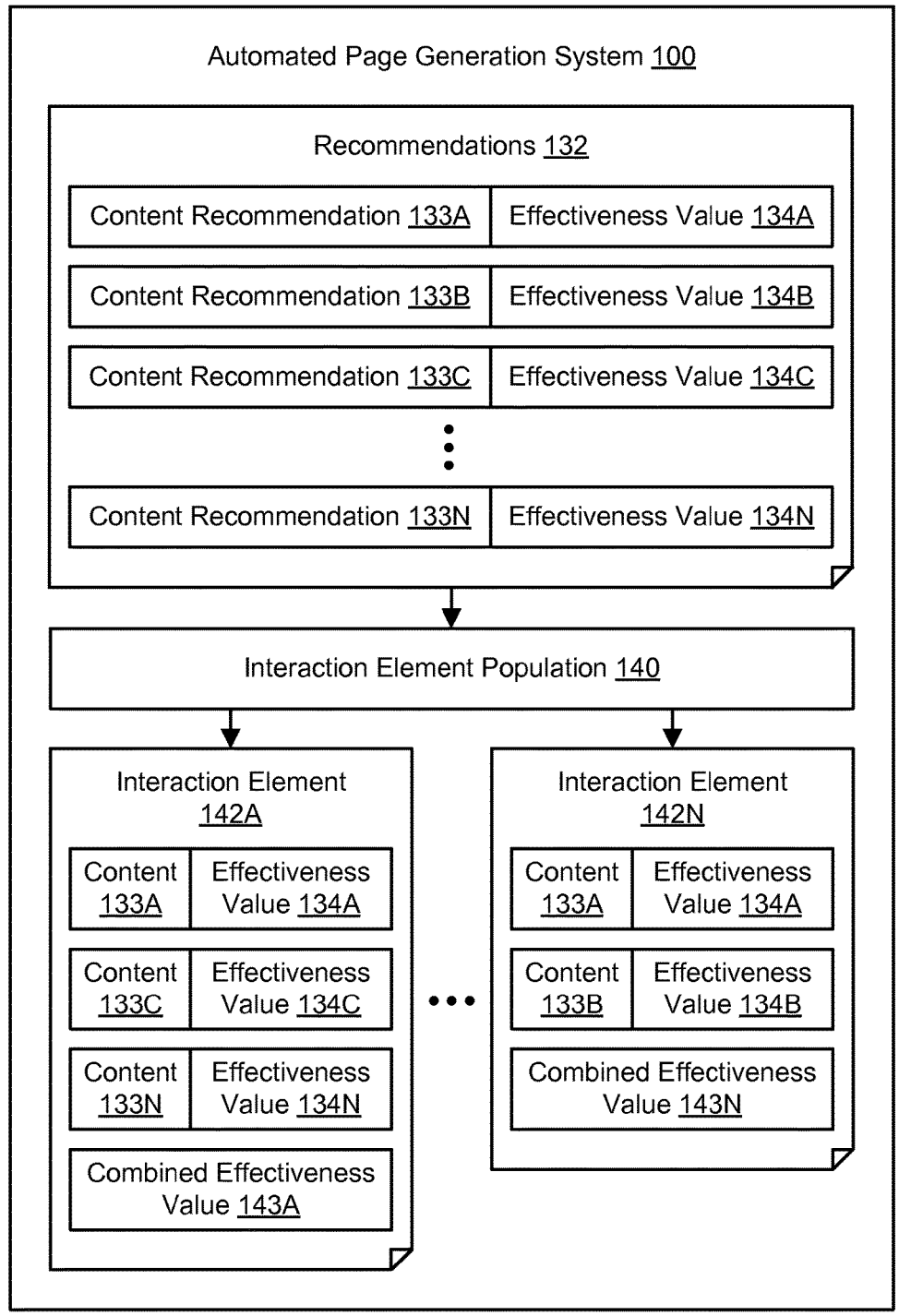
FIG. 3 illustrates an example of interaction elements populated with content recommendations, according to one embodiment.

FIG. 3 illustrates an example of interaction elements populated with content recommendations, according to one embodiment. As discussed above, the interaction element population functionality 140 may assign particular content recommendations to particular interaction elements. As shown in the example of FIG. 3, the interaction elements may include interaction elements 142A through 142N. Although two interaction elements 142A and 142N are shown for purposes of illustration and example, it is contemplated that other numbers and configurations of interaction elements may be used with the automated page generation system 100. The interaction elements 142A-142N may represent different ways of visualizing content in a web page. For example, the interaction elements 142A-142N may include various configurations for vertical lists of products or promotions, horizontal lists of products or promotions, tiled displays of products or promotions, scrollable displays of products or promotions, and other suitable ways of showing content. The interaction elements 142A-142N may be selected from a set of available interaction elements on any suitable basis, e.g., based on characteristics of the request, characteristics of the customer, characteristics of the recommenders, characteristics of the recommendations, and/or other suitable characteristics.

The content recommendations 133A-133N may be assigned to the various interaction elements 142A-142N based on their effectiveness values 134A-134N, e.g., their initial effectiveness values multiplied by the confidence values for the recommenders. The content recommendations 133A-133N may also be assigned to various interaction elements 142A-142N based on rules associated with the interaction elements and/or with the interaction layer 112. In one embodiment, each interaction element may be assigned the recommendations with the highest effectiveness values that qualify under the rules for the interaction element. The rules may qualify or disqualify particular recommendations for a particular interaction element. For example, a particular interaction element may accept content recommendations only from one or more designated recommenders. As another example, a particular interaction element may accept no more than a particular number of content recommendations. As another example, a particular interaction element may accept content recommendations only related to a particular product. As yet another example, a particular interaction element may implement a rule to honor a contractual agreement regarding one or more products, e.g., to disqualify promoting a competitor. In one embodiment, a particular recommendation may be assigned to multiple interaction elements 142A-142N. For example, the element of recommended content 133A may be assigned to both interaction element 142A and interaction element 142N. In one embodiment, a particular recommendation may be assigned to none of the interaction elements 142A-142N. As shown in the example of FIG. 3, the content recommendations 133A, 133C, and 133N are assigned to the interaction element 142A, and the content recommendations 133A and 133B are assigned to the interaction element 142N.

In one embodiment, combined effectiveness values may be determined for the interaction elements given the assignments of content recommendations 133A-133N to the interaction elements 142A-142N. As shown in FIG. 3, the interaction element 142A may have a combined effectiveness value 143A, and the interaction element 142N may have a combined effectiveness value 143N. The combined effectiveness values 143A and 143N may represent a degree of expected influence of the corresponding populated interaction element relative to the one or more goal metrics for the web page. In one embodiment, the effectiveness value 143A for the interaction element 142A may be determined based at least in part on the effectiveness values 134A, 134C, and 134N for the assigned content recommendations 133A, 133C, and 133N. Similarly, the effectiveness value 143N for the interaction element 142N may be determined based at least in part on the effectiveness values 134A and 134B for the assigned content recommendations 133A and 133B.

The effectiveness values for the assigned content recommendations may be combined in any suitable manner to produce the effectiveness values 143A and 143N for the interaction elements. For example, the effectiveness value for a particular interaction element may represent an arithmetic mean of the effectiveness values of the assigned content recommendations. In one embodiment, the effectiveness value for a particular interaction element may also be based on a confidence multiplier for the interaction element itself, e.g., by a confidence value between zero and one that is multiplied by the effectiveness value for the particular interaction element. The confidence multiplier for the interaction element may be determined using any suitable technique(s), including machine learning techniques based on the history of one or more customers (e.g., this particular customer) interacting with the particular interaction element. The confidence multiplier for the interaction element may be global or may be associated only with the particular customer who sent the request.

Figure 4:
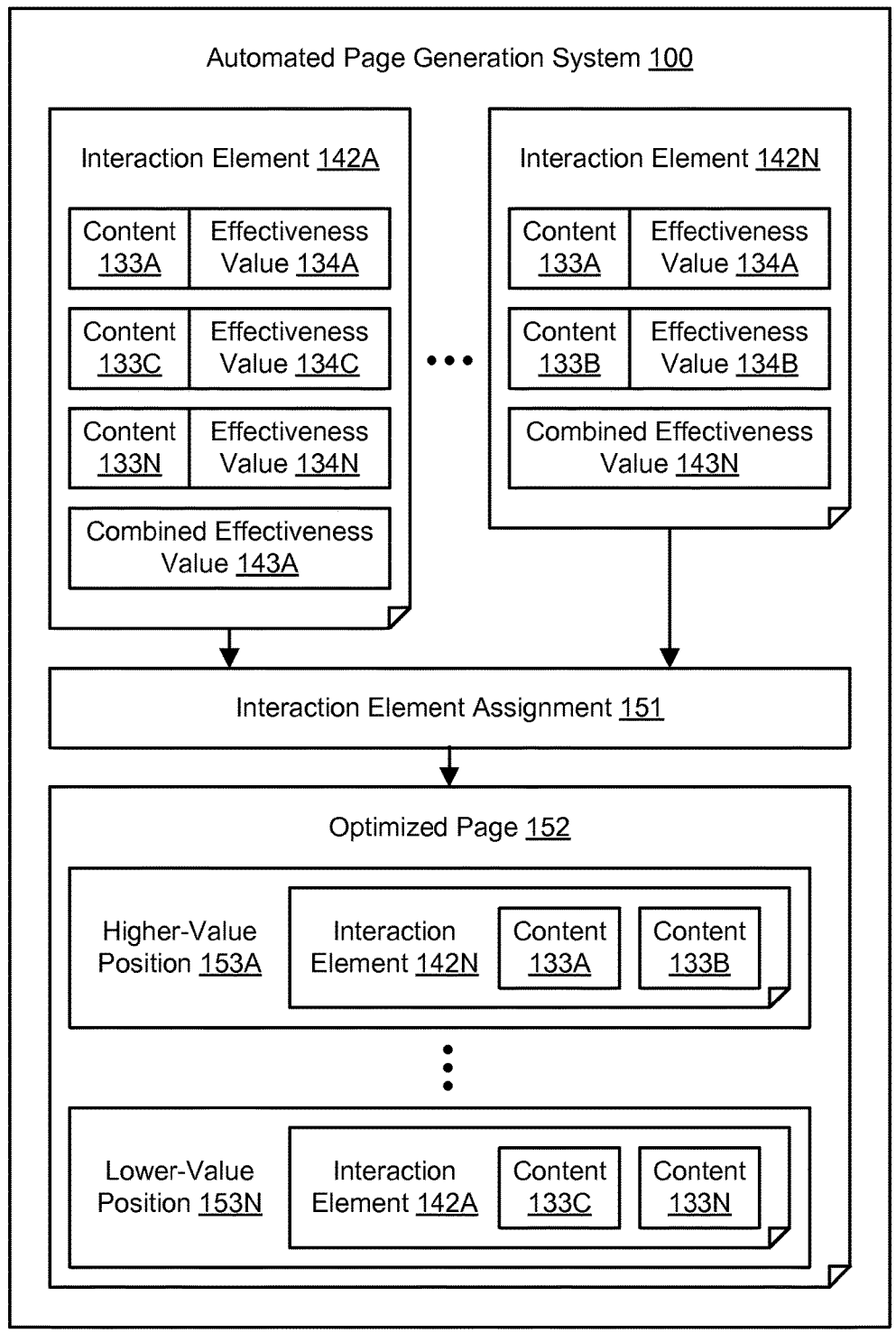
FIG. 4 illustrates an example of a web page automatically optimized using content recommendations, according to one embodiment.

FIG. 4 illustrates an example of a web page automatically optimized using content recommendations, according to one embodiment. As discussed above, the interaction element assignment functionality 151 may assign particular interaction elements 142 to particular locations in the interaction layer 112. The various locations may be associated with different values, e.g., relative to the one or more metrics. For example, locations earlier or higher in the interaction layer 112 may be associated with higher values than locations later or lower in the interaction layer. As shown in the example of FIG. 4, the interaction layer 112 and resulting web page 152 may include a higher-value position (or location or portion) 153A and a lower-value position (or location or portion) 153N. Although two positions 153A and 153N are shown for purposes of illustration and example, it is contemplated that other numbers and configurations of positions in an interaction layer 112 and/or resulting web page 152 may be used with the automated page generation system 100.

The assignments may be determined based at least in part on the effectiveness values for the interaction elements 142A and 142N and on the optimization of the one or more goal metrics for the web page. For example, recommendations (or sets of recommendations) with higher effectiveness values may be placed in more valuable locations than recommendations (or sets of recommendations) with lower effectiveness values. As shown in the example of FIG. 4, the combined effectiveness value 143N may be greater than the combined effectiveness value 143A. Accordingly, the interaction element 142N associated with the greater combined effectiveness value 143N may be placed in the higher-value position 153A. The interaction element 142A associated with the lesser combined effectiveness value 143A may be placed in the lower-value position 153N. In this manner, the web page 152 may be automatically and dynamically built to optimize one or more goal metrics.

The interaction elements may be placed in the interaction layer 112 (and thus in the resulting web page 152) in an iterative manner, and remaining (unplaced) interaction elements may be updated after each interaction element is placed in the optimized page 152. In updating the remaining interaction elements, relevant rules and/or filters may be applied. Rules may be associated with particular products or vendors, interaction layers, and/or interaction elements. For example, after the interaction element 142N is placed in the position 153A with the content recommendation 133A, that content recommendation may be removed from remaining (unplaced) interaction elements such as interaction element 142A. In this manner, the automated page generation system 100 may avoid placing duplicate content recommendations in a single web page. Additionally, the effectiveness metrics for individual content recommendations and/or the combined effectiveness metrics for remaining interaction elements may be recalculated after an interaction element is placed in the web page 152. In one embodiment, the effectiveness values of various interaction elements may be evaluated in combination with other interaction elements. Appropriate heuristics may be used to evaluate such combinations.

Figure 5:
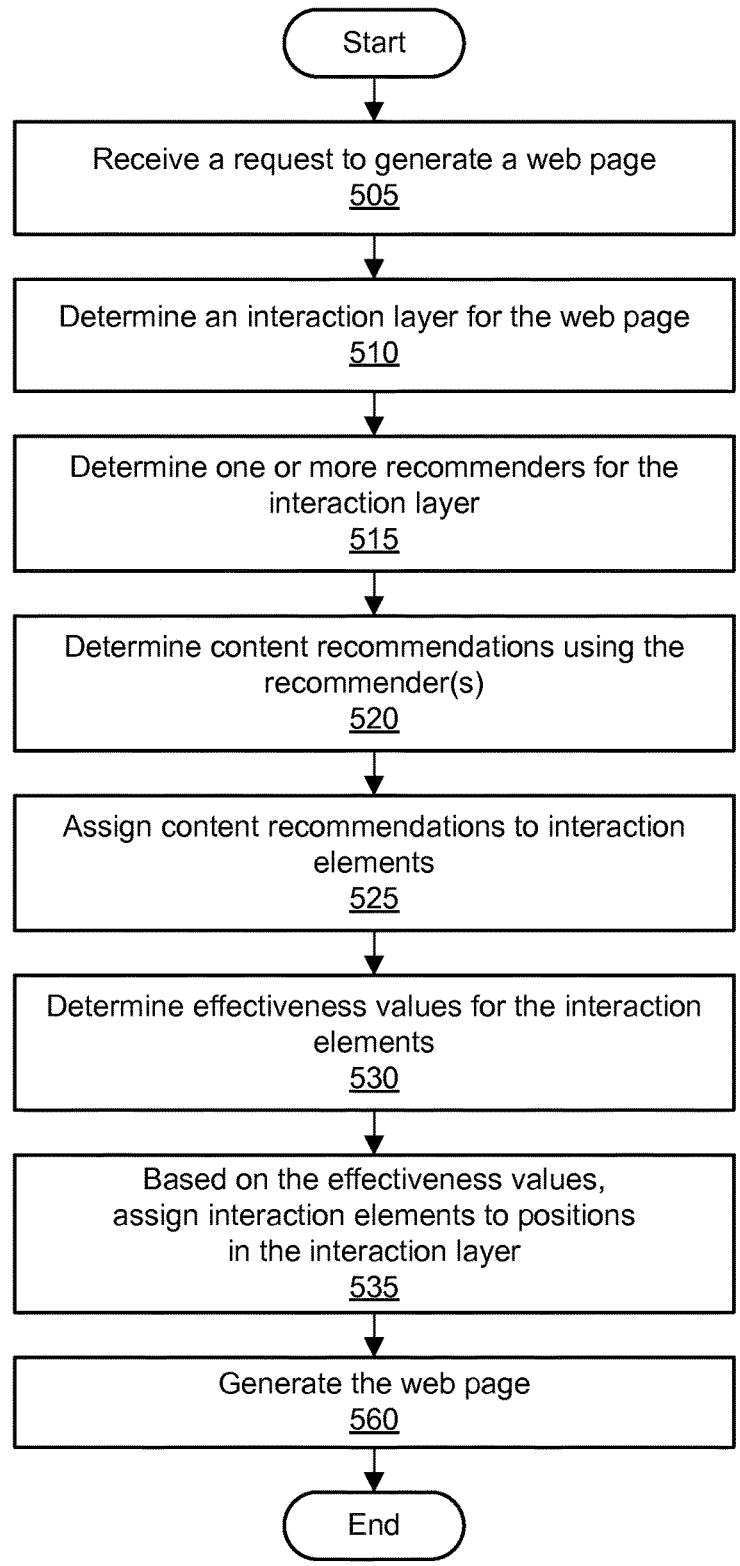
FIG. 5 is a flowchart illustrating a method for automated page generation using value-based recommendations, according to one embodiment.

FIG. 5 is a flowchart illustrating a method for automated page generation using value-based recommendations, according to one embodiment. As shown in 505, a request to generate a web page may be received, e.g., from a customer of a merchant. The request may include particular characteristics, e.g., characteristics of the type of web page requested and/or other contents of the request. The customer may also be associated with particular characteristics, e.g., characteristics associated with a customer account and/or customer session. The requested web page may be characterized by one or more goal metrics, such as a profit metric and/or user engagement metric, and the web page may be automatically generated in order to optimize the one or more goal metrics. As used herein, the terms "optimize" and "optimized" generally refer to improvement relative to one or more goals rather than necessarily optimal or ideal.

As shown in 510, an interaction layer may be determined for the web page. The interaction layer may include a plurality of locations for interaction elements and may represent a base or template on which to build the requested web page. The interaction elements may represent different ways of visualizing content in a web page. The interaction layer may also be characterized by a set of dimensions, e.g., representing available pixels in the horizontal and vertical axes. The interaction layer may be selected or otherwise determined based on characteristics of the request, characteristics of the customer, and/or other suitable characteristics. For example, the interaction layer may be selected based at least in part on the available screen space of the device from which the request originated. As another example, the interaction layer may be selected based at least in part on the type of web page requested, e.g., home pages, product detail pages, product category pages, search result pages, shopping cart pages, post-checkout pages, and/or other suitable types of pages.

As shown in 515, one or more recommenders may be determined for the interaction layer. The recommenders may represent various modules, services, or other programmatic entities that may be invoked to produce recommendations for content to include in the web page. For example, one recommender may be configured to generate recommendations based on products reachable from a particular browse node, another recommender may be configured to generate recommendations based on new product offerings at the merchant, another recommender may be configured to generate recommendations based on related product offerings to earlier recommendations, and yet another recommender may be configured to generate recommendations based on session similarities. As another example, another recommender may be configured to generate negative recommendations based on recent purchases or recent browse history; these negative recommendations may essentially disqualify items from being placed on the page. The automated page generation system may implement filters to disqualify some products and/or promotions from inclusion in a web page, either using negative recommendations or any other suitable filtering technique. The recommenders may be determined based on characteristics of the request, characteristics of the customer or customer device, and/or other suitable characteristics.

As shown in 520, a plurality of content recommendations may be determined using the one or more recommenders. As discussed above, the recommenders may be invoked to produce recommendations for content to include in the web page. The recommendations may include products, promotions, and/or other suitable types of content. Different recommenders may produce different sets of recommendations. Each recommendation may be associated with an initial effectiveness value, e.g., a degree of expected influence relative to the one or more goal metrics for the web page. Additionally, each recommender may be associated with a confidence value, and the initial effectiveness value may be multiplied by the confidence value (also referred to as a confidence multiplier). The confidence values may range from zero to one, and the confidence values may be positive or negative. The confidence multiplier for a recommender may be determined using any suitable technique(s), including machine learning techniques based on the history of one or more customers (e.g., this particular customer) interacting with recommendations from a particular recommender. The confidence multiplier for the recommender may be global or may be associated only with the particular customer who sent the request. The recommendations may be produced based on characteristics of the request for the web page, characteristics of the customer who produced the request, and/or other suitable characteristics.

As shown in 525, individual content recommendations may be assigned to individual interaction elements. The interaction elements may be selected from a set of available interaction elements on any suitable basis, e.g., based on characteristics of the request, characteristics of the customer, characteristics of the recommenders, characteristics of the recommendations, and/or other suitable characteristics. The content recommendations may be assigned to the various interaction elements based on their effectiveness values, e.g., their initial effectiveness values multiplied by the confidence values for the recommenders. The content recommendations may be assigned to various interaction elements based on rules associated with the interaction elements and/or with the interaction layer. In one embodiment, each interaction element may be assigned the recommendations with the highest effectiveness values that qualify under the rules for the interaction element. The rules may qualify or disqualify particular recommendations for a particular interaction element. For example, a particular interaction element may accept content recommendations only from one or more designated recommenders. As another example, a particular interaction element may accept no more than a particular number of content recommendations. As another example, a particular interaction element may accept content recommendations only related to a particular product. As yet another example, a particular interaction element may implement a rule to honor a contractual agreement regarding one or more products, e.g., to disqualify promoting a competitor. In one embodiment, a particular recommendation may be assigned to multiple interaction elements. In one embodiment, a particular recommendation may be assigned to none of the interaction elements.

As shown in 530, effectiveness values may be determined for the interaction elements given the assignments of content recommendations to the interaction elements. The effectiveness values for the interaction elements may represent a degree of expected influence relative to the one or more goal metrics for the web page. In one embodiment, the effectiveness values for the interaction elements may be determined based at least in part on the effectiveness values for the assigned content recommendations, e.g., their initial effectiveness values multiplied by the confidence values for the corresponding recommenders. The effectiveness values for the assigned content recommendations may be combined in any suitable manner to produce the effectiveness values for the interaction elements. For example, the effectiveness value for a particular interaction element may represent an arithmetic mean of the effectiveness values of the assigned content recommendations. In one embodiment, the effectiveness value for a particular interaction element may also be based on a confidence multiplier for the interaction element itself, e.g., by a confidence value between zero and one that is multiplied by the effectiveness value for the particular interaction element. The confidence multiplier for the interaction element may be determined using any suitable technique(s), including machine learning techniques based on the history of one or more customers (e.g., this particular customer) interacting with the particular interaction element. The confidence multiplier for the interaction element may be global or may be associated only with the particular customer who sent the request.

As shown in 535, particular interaction elements may be assigned to particular locations in the interaction layer. The various locations may be associated with different values, e.g., relative to the one or more metrics. For example, locations earlier or higher in the interaction layer may be associated with higher values than locations later or lower in the interaction layer. The assignments may be determined based at least in part on the effectiveness values for the interaction elements and on the optimization of the one or more goal metrics for the web page. For example, the most effective interaction element may be placed in the most valuable location in the web page, and the second most effective interaction element may be placed in the second most valuable location in the web page. In this manner, web pages may be automatically and dynamically built to optimize one or more goal metrics. The operation shown in 535 is discussed in greater detail with respect to FIG. 6.

Turning back to FIG. 5, as shown in 560, the web page may be generated based at least in part on the assignments determined in the operation shown in 535. Accordingly, the web page may be generated based on the interaction layer and the particular interaction elements assigned to particular locations in the interaction layer. The web page (e.g., the code and/or data for the web page) may then be provided to the device from which the request originated, e.g., by sending the relevant code and/or data across a network to the target device. In one embodiment, portions of the web page may be sent to the target device before all of the web page has been generated.

Figure 6:
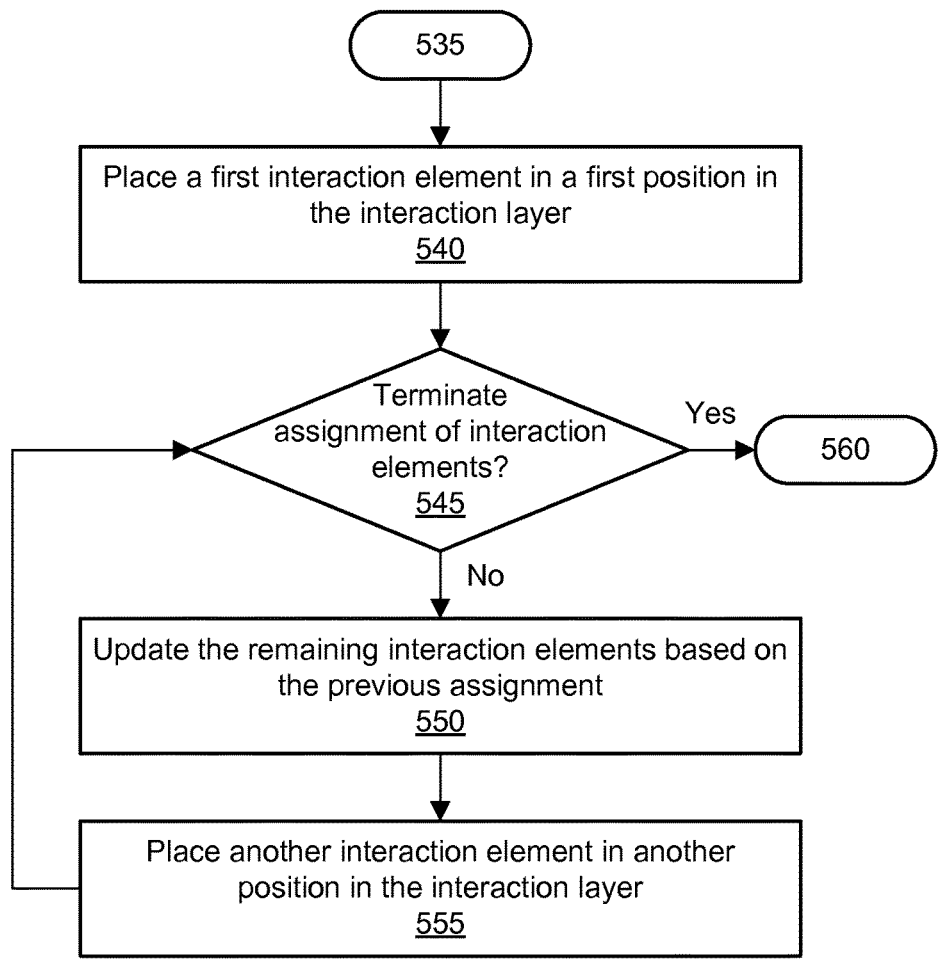
FIG. 6 is a flowchart illustrating further aspects of the method for automated page generation using value-based recommendations, according to one embodiment.

FIG. 6 is a flowchart illustrating further aspects of the method for automated page generation using value-based recommendations, according to one embodiment. The operations shown in FIG. 6 may represent further aspects of the operation shown in 535 in FIG. 5. As shown in 540, a first interaction element may be placed in a first location in the interaction layer. Each location in the interaction layer may also represent a position in a web page or a portion of a web page. The first interaction element may have the highest effectiveness score, e.g., relative to the one or more goal metrics for the web page. The first location may represent the most valuable location in the web page.

As shown in 545, it may be determined whether to terminate the assignment of interaction elements. In one embodiment, the assignment of interaction elements may be terminated when there are no more locations in which to place interaction elements. In one embodiment, the assignment of interaction elements may be terminated when there are no more interaction elements to place in the interaction layer. In one embodiment, the assignment of interaction elements may be terminated when the time used to build the web page has met or exceeded a threshold duration of time. If the assignment of interaction elements is terminated, then the method may proceed with the generation and sending of the web page as shown in 560.

If the assignment of interaction elements is not terminated, then as shown in 550, the remaining interaction elements (i.e., the interaction elements not already assigned to locations in the interaction layer) may be updated. In one embodiment, the content recommendations for the remaining interaction elements may be updated, if necessary. In one embodiment, any of the content recommendations in an interaction element that has been assigned to a location may be removed from the remaining interaction elements. In this manner, a particular content recommendation may not be duplicated in the same web page. In one embodiment, the effectiveness values for the remaining interaction elements may also be updated, if necessary.

As shown in 555, another interaction element may be placed in another location in the interaction layer. In one embodiment, the interaction element with the next highest effectiveness value may be placed in the next most valuable location. The method may then proceed with the operation shown in 545. In this manner, interaction elements may be assigned to various locations in the interaction layer until the interaction layer is full, the interaction elements are all assigned, or a timeout is reached.

Illustrative Computer System

In at least some embodiments, a computer system that implements a portion or all of one or more of the technologies described herein may include a general-purpose computer system that includes or is configured to access one or more computer-readable media. FIG. 7 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
  one or more computing devices configured to implement an automated page generation system, wherein the automated page generation system is configured to:
    receive, from a customer, a request to generate a web page;
    determine an interaction layer for the web page, wherein the interaction layer comprises a plurality of locations for interaction elements and a set of dimensions;
    determine from among a plurality of recommenders, one or more recommenders for the web page;
    determine a plurality of content recommendations using the one or more recommenders;
    assign individual ones of the content recommendations to individual ones of a plurality of interaction elements;
    determine respective effectiveness values for individual ones of the interaction elements, wherein the respective effectiveness values are determined based at least in part on the individual ones of the content recommendations assigned to the individual ones of the interaction elements;
    based at least in part on a comparison of effectiveness values among the respective effectiveness values for the individual ones of the interaction elements, assign individual ones of the interaction elements corresponding to relatively higher effectiveness values to individual ones of the locations in the interaction layer corresponding to relatively higher location values for the plurality of locations; and
    generate the web page based at least in part on the individual ones of the interaction elements corresponding to relatively higher effectiveness values assigned to individual ones of the locations in the interaction layer corresponding to relatively higher location values for the plurality of locations.

2. The system as recited in claim 1, wherein the individual ones of the interaction elements are assigned to individual ones of the locations based at least in part on optimization of one or more goal metrics for the web page.

3. The system as recited in claim 1, wherein the automated page generation system is further configured to:
  after a particular one of the interaction elements is assigned to a particular one of the locations in the interaction layer, remove one or more of the content recommendations in the particular one of the interaction elements from remaining ones of the interaction elements.

4. The system as recited in claim 1, wherein the automated page generation system is further configured to:

after a particular one of the interaction elements is assigned to a particular one of the locations in the interaction layer, update the respective effectiveness values for remaining ones of the interaction elements.

5. A computer-implemented method, comprising:
determining a plurality of content recommendations for a page, wherein the plurality of content recommendations are determined using one or more recommenders of a plurality of recommenders;
assigning individual ones of the content recommendations to individual ones of a plurality of interaction elements;
determining respective effectiveness values for individual ones of the interaction elements, wherein the respective effectiveness values are determined based at least in part on the individual ones of the content recommendations assigned to the individual ones of the interaction elements;
based at least in part on a comparison of effectiveness values among the respective effectiveness values for the individual ones of the interaction elements, assigning individual ones of the interaction elements corresponding to relatively higher effectiveness values to respective portions of the page corresponding to relatively higher location values for the respective portions of the page; and
generating the page based at least in part on the individual ones of the interaction elements corresponding to relatively higher effectiveness values assigned to the respective portions of the page corresponding to relatively higher location values for the respective portions of the page.

6. The method as recited in claim 5, wherein the individual ones of the interaction elements are assigned to the respective portions of the page based at least in part on optimization of one or more goal metrics for the page.

7. The method as recited in claim 5, further comprising:
after a particular one of the interaction elements is assigned to a particular one of the portions of the page, removing one or more of the content recommendations in the particular one of the interaction elements from remaining ones of the interaction elements.

8. The method as recited in claim 5, further comprising:
after a particular one of the interaction elements is assigned to a particular one of the portions of the page, updating the respective effectiveness values for remaining ones of the interaction elements.

9. The method as recited in claim 5, wherein the individual ones of the content recommendations are assigned to the individual ones of the interaction elements based at least in part on evaluation of one or more rules.

10. The method as recited in claim 5, wherein individual ones of the content recommendations are disqualified from individual ones of the interaction elements based at least in part on evaluation of one or more rules.

11. The method as recited in claim 5, wherein the one or more recommenders are determined based on one or more characteristics of a request for the page, one or more characteristics of a customer who sent the request, or one or more characteristics of the request and one or more characteristics of the customer.

12. The method as recited in claim 5, wherein the respective effectiveness values for individual ones of the interaction elements are determined based at least in part on respective effectiveness values for individual ones of the content recommendations, and wherein the respective effectiveness values for individual ones of the content recommendations are determined based at least in part on initial effectiveness values assigned by corresponding ones of the recommenders and confidence multipliers assigned to the corresponding ones of the recommenders.

13. A non-transitory computer-readable storage medium storing program instructions computer-executable to perform:
determining an interaction layer for a web page, wherein the interaction layer comprises a plurality of locations for interaction elements;
determining a plurality of content recommendations for the web page, wherein the plurality of content recommendations are determined using one or more recommenders of a plurality of recommenders;
assigning individual ones of the content recommendations to individual ones of a plurality of interaction elements;
determining respective effectiveness values for individual ones of the interaction elements, wherein the respective effectiveness values are determined based at least in part on the individual ones of the content recommendations assigned to the individual ones of the interaction elements;
based at least in part on a comparison of effectiveness values among the respective effectiveness values for the individual ones of the interaction elements, assigning individual ones of the interaction elements corresponding to relatively higher effectiveness values to individual ones of the locations in the interaction layer corresponding to relatively higher location values for the plurality of locations; and
generating the web page based at least in part on the individual ones of the interaction elements corresponding to relatively higher effectiveness values assigned to individual ones of the locations in the interaction layer corresponding to relatively higher location values for the plurality of locations.

14. The computer-readable storage medium as recited in claim 13, wherein the individual ones of the interaction elements are assigned to the individual ones of the locations in the interaction layer based at least in part on optimization of one or more goal metrics for the web page.

15. The computer-readable storage medium as recited in claim 13, wherein the program instructions are further computer-executable to perform:
after a particular one of the interaction elements is assigned to a particular one of the locations in the interaction layer, removing one or more of the content recommendations in the particular one of the interaction elements from remaining ones of the interaction elements.

16. The computer-readable storage medium as recited in claim 13, wherein the program instructions are further computer-executable to perform:
after a particular one of the interaction elements is assigned to a particular one of the locations in the interaction layer, updating the respective effectiveness values for remaining ones of the interaction elements.

17. The computer-readable storage medium as recited in claim 13, wherein the individual ones of the content recommendations are assigned to the individual ones of the interaction elements based at least in part on evaluation of one or more rules.

18. The computer-readable storage medium as recited in claim 13, wherein individual ones of the content recommendations are disqualified from individual ones of the interaction elements based at least in part on evaluation of one or more rules.

19. The computer-readable storage medium as recited in claim 13, wherein the one or more recommenders are determined based on one or more characteristics of a request for the web page, one or more characteristics of a customer who sent the request, or one or more characteristics of the request and one or more characteristics of the customer.

20. The computer-readable storage medium as recited in claim 13, wherein the respective effectiveness values for individual ones of the interaction elements are determined based at least in part on respective effectiveness values for individual ones of the content recommendations, and wherein the respective effectiveness values for individual ones of the content recommendations are determined based at least in part on initial effectiveness values assigned by corresponding ones of the recommenders and confidence multipliers assigned to the corresponding ones of the recommenders.

\* \* \* \* \*